US009768677B2

(12) United States Patent
Ayana et al.

(10) Patent No.: US 9,768,677 B2
(45) Date of Patent: Sep. 19, 2017

(54) SPLIT PHASE POWER CONVERSION APPARATUSES, METHODS AND SYSTEMS

(71) Applicant: Cummins Power Generation IP, Inc., Minneapolis, MN (US)

(72) Inventors: Elias Ayana, Minneapolis, MN (US); Shabari Nath, Minneapolis, MN (US); Abel Solorzano, Saint Louis Park, MN (US); Andrew Walseth, Mounds View, MN (US); Sergey Kunin, Minnetonka, MN (US); Brad Palmer, Ham Lake, MN (US)

(73) Assignee: CUMMINS POWER GENERATION IP, INC., Minneapolis, MN (US)

( * ) Notice: Subject to any disclaimer, the term of this patent is extended or adjusted under 35 U.S.C. 154(b) by 0 days.

(21) Appl. No.: 15/061,502

(22) Filed: Mar. 4, 2016

(65) Prior Publication Data

US 2016/0190907 A1    Jun. 30, 2016

Related U.S. Application Data

(63) Continuation of application No. 14/159,208, filed on Jan. 20, 2014, now Pat. No. 9,293,978.

(51) Int. Cl.
*H02M 1/08* (2006.01)
*H02M 1/084* (2006.01)
*H02M 5/458* (2006.01)

(52) U.S. Cl.
CPC ........... *H02M 1/084* (2013.01); *H02M 5/458* (2013.01); *H02M 5/4585* (2013.01)

(58) Field of Classification Search
CPC ....... H02M 1/08; H02M 5/458; H02M 7/5371
(Continued)

(56) References Cited

U.S. PATENT DOCUMENTS

| 5,053,939 A | 10/1991 | Kirchberg et al. |
| 5,055,992 A | 10/1991 | Cook |

(Continued)

FOREIGN PATENT DOCUMENTS

EP    0 726 641    8/1996

OTHER PUBLICATIONS

Chen, et al. "Study and Implementation of the Single-Phase Three-Wire Photovoltaic Energy Conversion System," IEEE 1999 International Conference on Power Electronics and Drive Systems, PEDS'99, Jul. 1999, Hong Kong.

(Continued)

*Primary Examiner* — Jeffrey Sterrett
(74) *Attorney, Agent, or Firm* — Foley & Lardner LLP

(57) ABSTRACT

Split phase power conversion apparatuses, methods and systems are disclosed. One exemplary embodiment includes a generator, an AC/DC converter coupled with the generator, a DC bus coupled with the AC/DC converter, and an inverter coupled with the DC bus. The inverter includes first, second, and third legs each including a plurality of switches. A first controller provides a control signal to the first leg based upon a voltage between a first system output and a second system output and a first current provided to the first system output. A second controller provides a second control signal to the second leg based upon a voltage between the second system output and a third system output and a second current provided to the third system output. A third controller controls the third leg to provide an output equal to one half of the DC bus voltage.

22 Claims, 6 Drawing Sheets

(58) Field of Classification Search
USPC .................................. 363/34, 35, 36, 37, 98
See application file for complete search history.

(56) References Cited

U.S. PATENT DOCUMENTS

| | | |
|---|---|---|
| 5,136,494 A | 8/1992 | Akagi et al. |
| 5,450,306 A | 9/1995 | Garces et al. |
| 6,643,156 B2 | 11/2003 | Zubieta |
| 7,379,313 B2 | 5/2008 | Yaguchi |
| 7,920,395 B2 | 4/2011 | Ishida et al. |
| 8,344,551 B2 | 1/2013 | Nielsen |
| 8,476,873 B2 | 7/2013 | Green |
| 8,610,308 B2 | 12/2013 | Shires et al. |
| 9,293,978 B2 * | 3/2016 | Ayana .................. H02M 1/084 |
| 2004/0155526 A1 | 8/2004 | Naden et al. |
| 2005/0169018 A1 | 8/2005 | Hatai et al. |
| 2007/0247876 A1 | 10/2007 | Garabandic |
| 2010/0118569 A1 | 5/2010 | Kono et al. |
| 2011/0080042 A1 | 4/2011 | Kumar |
| 2012/0194111 A1 | 8/2012 | Kawashima et al. |
| 2015/0207396 A1 | 7/2015 | Ayana et al. |
| 2015/0256083 A1 | 9/2015 | Ito |
| 2015/0256095 A1 | 9/2015 | Ohta |
| 2016/0190907 A1 * | 6/2016 | Ayana .................. H02M 1/084 363/37 |

OTHER PUBLICATIONS

Chiang, S.J. et al., "Single-Phase Three-Wire Transformerless Inverter," IEE Proc.-Electr. Power. Appl. vol. 141, No. 4, Jul. 1994.
The International Search Report and Written Opinion issued in PCT/US2015/011605, dated Apr. 20, 2015.

* cited by examiner

SPLIT PHASE POWER CONVERSION APPARATUSES, METHODS AND SYSTEMS

CROSS-REFERENCE TO RELATED APPLICATIONS

The present application is a continuation of U.S. patent application Ser. No. 14/159,208, filed Jan. 20, 2014, the contents of which are incorporated herein by reference in their entirety.

BACKGROUND

Split phase power conversion is useful in connection with a number of applications, including auxiliary power systems in recreational vehicles (RVs), marine power systems, home and commercial standby power systems, and mobile power systems. Traditionally, split phase power conversion systems utilized a center-tapped transformer between an inverter and a load to provide two AC voltages 180 degrees out of phase with respect of a common neutral and another AC voltage across the two phases. A number of efforts have been made to eliminate the need for center-tapped transformers while providing split phase output from an inverter. There exist a number of disadvantages and drawbacks with these efforts, including harmonic distortion, output ripple, performance limitations with respect to imbalanced output loads, and the complexity of inverter controls to name several examples. There remains a significant need for the unique split phase power conversion apparatuses, systems and methods disclosed herein.

DISCLOSURE

For the purposes of clearly, concisely and exactly describing exemplary embodiments of the invention, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art to which the invention relates.

SUMMARY

Unique split phase power conversion apparatuses, methods and systems are disclosed. One exemplary system includes a generator, an AC/DC converter coupled with the generator, a DC bus coupled with the AC/DC converter, and an inverter coupled with the DC bus. The inverter includes first, second, and third legs each including a plurality of switches. A first controller provides a control signal to the first leg based upon a voltage between a first system output and a second system output and a first current provided to the first system output. A second controller provides a second control signal to the second leg based upon a voltage between the second system output and a third system output and a second current provided to the third system output. A third controller controls the third leg to provide an output equal to one half of the DC bus voltage. Further embodiments, forms, objects, features, advantages, aspects, and benefits shall become apparent from the following description and figures.

DETAILED DESCRIPTION

Figure 1:
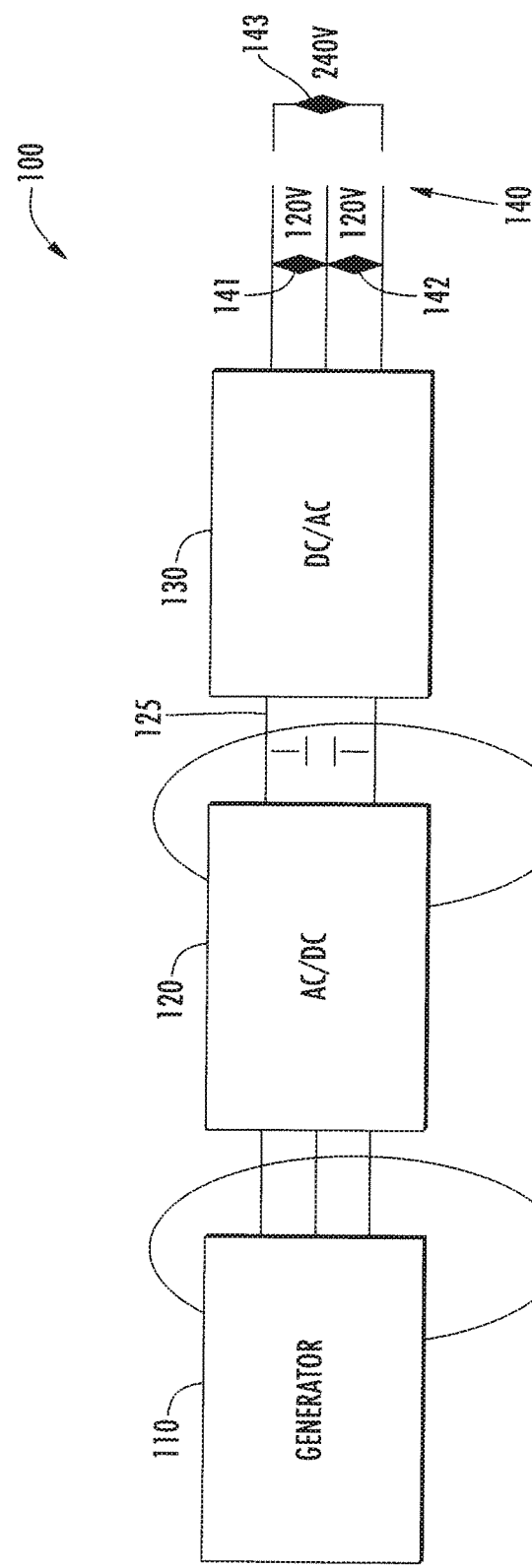
FIG. 1 a schematic illustration of an exemplary split phase power conversion system.

With reference to FIG. 1 there is illustrated an exemplary split phase power system 100 comprising generator 110, AC/DC converter 120, DC bus 125, DC/AC converter 130, and output stage 140. Generator 110 is coupled with and configured to provide an AC voltage to AC/DC converter 120. In the illustrated embodiment, generator 110 is configured to provide a three phase AC voltage output at variable frequencies and variable voltages. Other embodiments include generators providing a single phase AC voltage output or other multi-phase voltage outputs at variable frequencies and variable voltages. It is also contemplated that generators configured or controlled to provide a fixed output voltage and/or frequency may be utilized.

AC/DC converter 120 is configured to convert the AC voltage received from generator 110 to provide a DC output voltage. In some embodiments AC/DC converter 120 may utilize passive devices, such as diode bridge rectifiers, to provide uncontrolled AC/DC conversion. Other embodiments may utilize active devices, such as a power MOSFETs, BJTs or IGBTs, to provide controlled AC/DC conversion. Further embodiments may utilize combinations of active and passive devices. The output of AC/DC converter 120 is provided to first and second rails of DC bus 125. DC bus 125 includes a capacitor coupled with the first and second rails which mitigates ripple in the DC voltage output.

The first and second rails of DC bus 125 are coupled with DC/AC converter 130 which is configured to provide an AC output based upon the DC input received from DC bus 125. In the illustrated embodiment DC/AC converter is configured as a three leg inverter and includes three inverter outputs which are coupled with an output stage 140. Output stage 140 includes system outputs 141, 142 and 143 which are coupled with and configured to drive respective loads. In the illustrated embodiment outputs 141 and 142 are configured to provide nominal 120 VAC outputs which are 180 degrees out of phase with one another and output 143 is configured to provide a nominal 240 VAC output. It shall be appreciated that the particular voltages of the outputs may vary depending on the needs of the load being driven and that during operation the nominal voltage provided by an output may increase or decrease such as may occur due to load fluctuation or load imbalance. It shall also be appreciated that the aforementioned nominal voltages are not limiting and that systems with different nominal output voltages and phase differences are contemplated in certain embodiments. It shall further be appreciated that certain embodiments include additional or alternate output configurations such as those described below in connection with FIG. 6.

Figure 2:
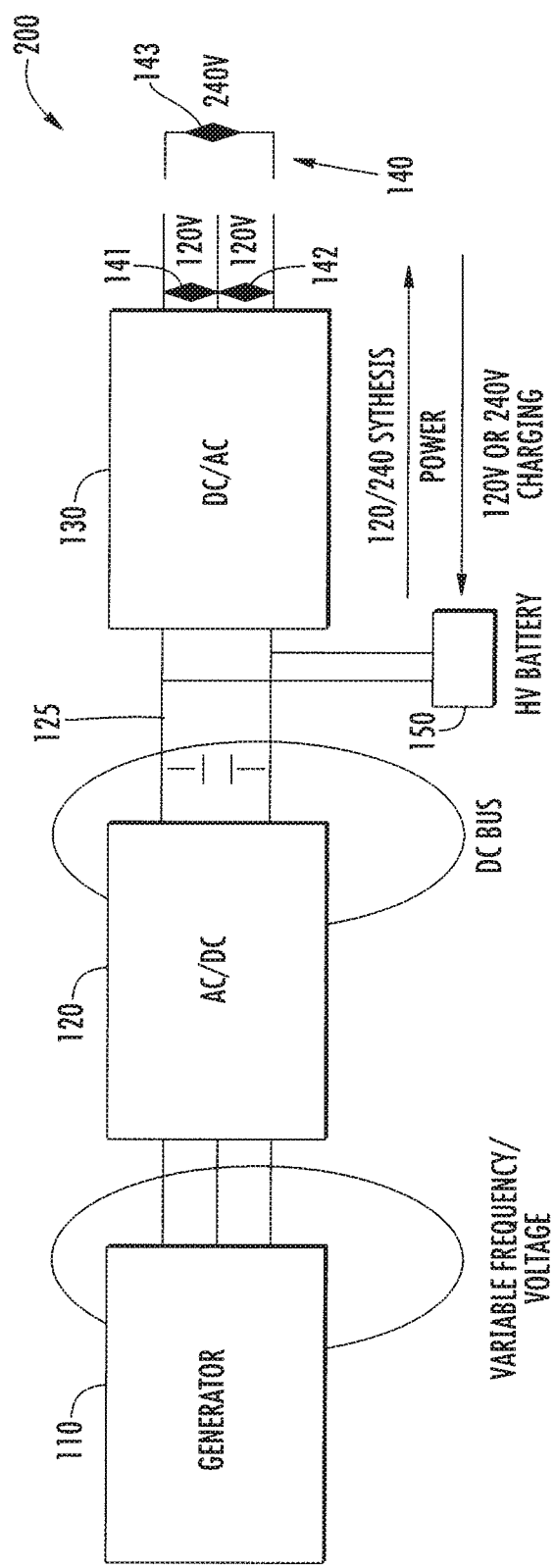
FIG. 2 is a schematic illustration of another exemplary split phase power conversion system.

With reference to FIG. 2 there is illustrated an exemplary split phase power system 200 including a number of features described above in connection with FIG. 1 which are labeled with like reference numerals. System 200 further includes a storage battery 150 which is coupled with DC bus 125 and is preferably a high voltage, multi-cell battery pack. System 200 may be controlled in a synthesis mode in which storage battery 150 compensates for transient conditions or interruptions in the output of generator 110 and/or AC/DC converter 120 by providing part or all of the current supplied to DC/AC converter 130. In the synthesis mode, storage battery 150 may be charged when the voltage across DC bus 125 provided by AC/DC converter 120 is greater than the voltage of storage battery 150 and may be discharged when the voltage across DC bus 125 provided by AC/DC converter 120 is less than the voltage of storage battery 150. It is contemplated that a battery control unit may be utilized to control the charging and discharging of storage battery 150.

Figure 3:
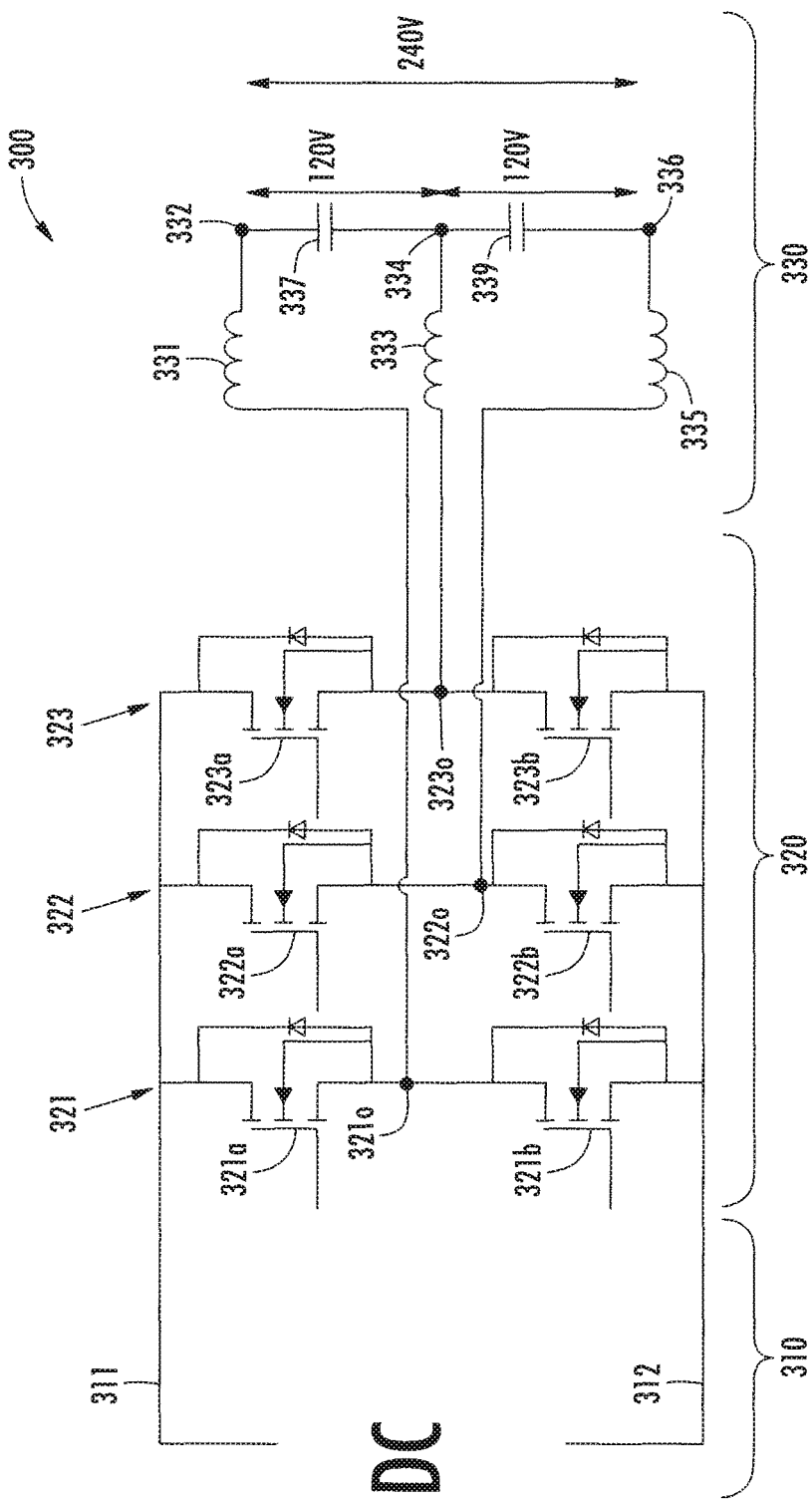
FIG. 3 is a circuit diagram illustrating exemplary inverter and output stages for a split phase power conversion system.

System 200 may also be controlled in a charging mode in which storage battery 150 is charged by current from one or more of the loads coupled with outputs 141, 142 and 143. In some configurations a DC source may be coupled with one of outputs 141, 142 and 143 and DC/AC converter 130 may be controlled to provide charging current to storage battery 150. In this, it is noted that it is possible to directly couple the DC source to the storage battery 150 through transistors of the DC/AC converter 130 to charge the storage battery 150. It is also possible to operate the DC/AC converter 130 in a boost mode of operation to boost the DC source to charge storage battery 150 utilizing inductors 335, 333, or 331 coupled to the outputs 141, 142, and 143, such as shown in FIG. 3, and the inherent diode in the transistor in the upper/first leg of the inverter bridge and switching with the lower/opposite transistor of the leg to induce the current flow. In other configurations, an AC source may be coupled with one of outputs 141, 142 and 143, and DC/AC converter 130 may be controlled to rectify the AC power and provide charging current to storage battery 150. This may occur, for example, in shore power situations where the outputs are connected to a utility power supply. In the illustrated embodiment DC/AC converter 130 is controllable to provide 120 VAC charging from sources coupled to output 141 or 142 as well as 240 VAC charging from sources coupled to output 143.

It is contemplated that systems 100 and 200 may be utilized in a number of applications, for example, auxiliary power systems in recreational vehicles (RVs), marine power systems, home and commercial standby power systems, and mobile power systems. It is further contemplated that the embodiments illustrated and described below in connection with FIGS. 3-6 may be utilized in connection with these applications and may be implemented in the systems of FIGS. 1 and 2.

With reference to FIG. 3 there is illustrated an exemplary system 300 including a DC bus 310, an inverter 320 and an output 330. DC bus 310 includes a first DC bus rail 311 and a second DC bus rail 312. Inverter 320 includes a first inverter leg 321, a second inverter leg 322, and a third inverter leg 323. Inverter leg 321 includes a first switching device 321a and a second switching device 321b coupled in series between the first rail 311 and the second rail 312 of DC bus 310. In the illustrated embodiment the switching devices are insulated gate bipolar transistor (IGBT) switching devices with anti-parallel diodes. It shall further be appreciated that a variety of other switching elements are contemplated in connection with system 300 as well as the other systems described herein including, for example, power MOSFET switching devices, as well as a variety of other devices. The switching devices are configured to receive control signals from one or more control modules (not illustrated in the present figure) effective to turn the switching devices on or off.

First inverter leg 321 includes an output node 3210 between switching device 321a and switching device 321b. Second inverter leg 322 includes a first switch 322a and a second switch 322b which are coupled in series between the first rail 311 and the second rail 312 of DC bus 310. Inverter leg 322 also includes an output node 322o between the first switching device 322a and second switching device 322b. Inverter leg 323 includes a first switching device 323a and a second switching device 323b coupled in series between first rail 311 and second rail 312 of DC bus 310. Third inverter leg 323 further includes an output node 323o between the switching device 323a and switching device 323b.

Output 330 includes a first output node 332, a second output node 334 and a third output node 336. A first system output is defined by output nodes 322 and 334, a second system output is defined by output nodes 336 and 334, and a third system output is defined by output nodes 332 and 336. Inductor 331 is coupled with output node 3210 and system output 332, inductor 333 is coupled with output node 323o and system output 334, and inductor 335 is coupled with output node 322o and system output node 336. Capacitor 337 is coupled with system output 332 and system output 334. Capacitor 339 is coupled with system output 334 and system output 336.

In the illustrated embodiment the output between output nodes 332 and 334, and the output between output nodes 334 and 336 are configured to provide 120 VAC outputs which are 180 degrees out of phase with one another, and the output between outputs nodes 332 and 336 is configured to provide a 240 VAC output. It shall be appreciated that the particular voltages of the outputs may vary depending on the needs of the load being driven and that during operation the nominal voltage provided by an output may increase or decrease such as may occur due to load fluctuation or load imbalance. It shall further be appreciated that certain embodiments may provide additional or alternate output configurations such as described below in connection with FIG. 6 and that these embodiments may be provided as dedicated output configurations or as selectable output configurations that may be varied by one or more controllers, or other output selection devices.

Figure 4:
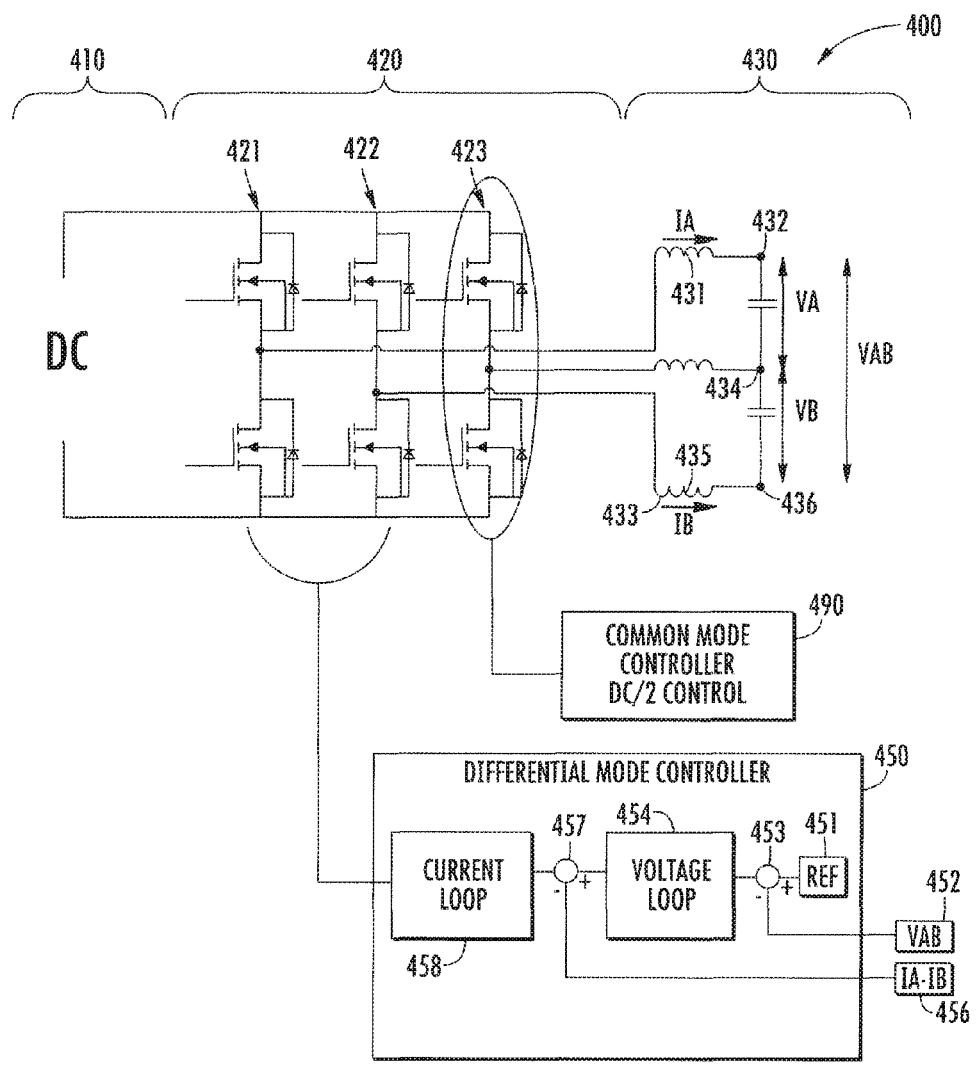
FIG. 4 is a circuit diagram illustrating exemplary inverter controls for a split phase power conversion system.

With reference to FIG. 4 there is illustrated an exemplary system 400 including a DC bus 410, an inverter 420 and an output 430 which may be the same as or similar to DC bus 310, inverter 320 and output 330 described above in connection with FIG. 3. Inverter 420 includes a first inverter leg 421, a second inverter leg 422, and a third inverter leg 423, which are coupled with output 430 in a manner similar to that described above in connection with FIG. 3.

System 400 includes a differential mode controller 450 configured to provide output signals to control the switches of inverter leg 421 and the switches of inverter leg 422. Differential mode controller 450 receives the voltage VAB between system output 432 and system output 436 at input 452 and receives a sinusoidal reference signal at input 451. Operator 453 determines the difference between input 451 and input 452 and provides that difference to proportional integral ("PI") voltage loop 454. PI voltage loop 454 outputs to operator 457. The difference between current IA flowing through inductor 431 and current IB flowing through inductor 435 is provided to input 450 and in turn to operator 457. Operator 457 provides the difference between the output of voltage loop 454 and input 456 to current loop 458. Current loop 458 is a PI current loop control which outputs control signals to the switches of inverter leg 421 and inverter leg 422. It is noted that split phase inverter control allows a smaller inductor 333, 433 to be utilized on the neutral leg of the output 330, 430 of the system.

System 400 further includes common mode controller 490 which is operable to control the switches of inverter leg 423 to provide a voltage equal to one half of the voltage of DC bus 410. Common mode controller 490 may utilize open loop controls to provide a 50% duty cycle effective to provide a voltage equal to one half of the voltage of DC bus 410. It shall be appreciated that the controls, controllers, and control modules described herein may be configured and implemented as software, firm ware, hardware, or combinations thereof, and may be implemented in individual control units or distributed among multiple control units in various embodiments. It is noted that closed loop control 490 using a PI control to control the neutral inverter leg/common mode output is possible and can be implemented in digital control or analog circuitry (for speed).

Figure 5:
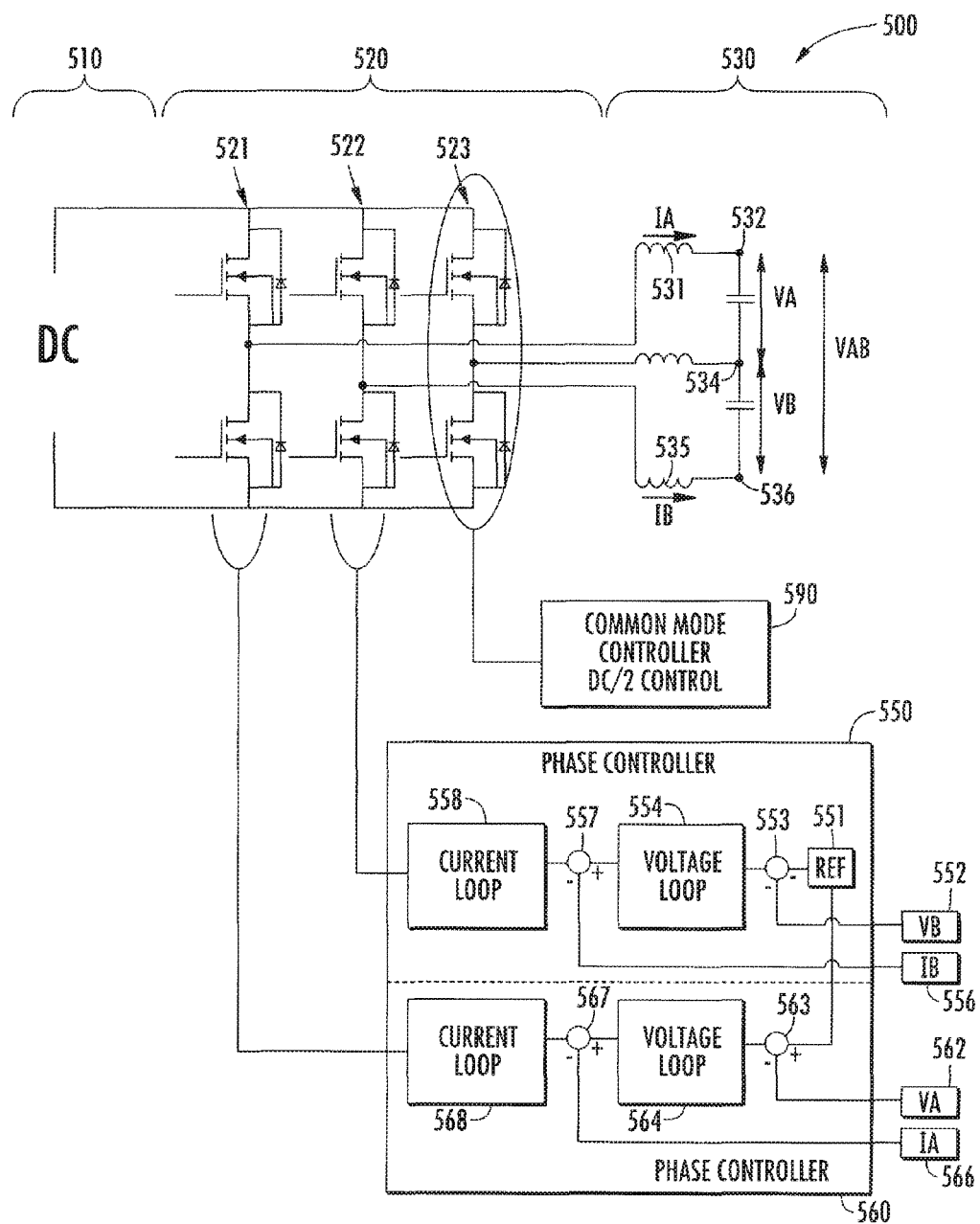
FIG. 5 is a circuit diagram illustrating further exemplary inverter controls for a split phase power conversion system.

With reference to FIG. 5 there is illustrated a system 500 including a DC bus 510, an inverter 520 and an output 530. Inverter 520 includes inverter leg 521, inverter leg 522, and inverter leg 523 whose output nodes are coupled with output 530. The switches of inverter leg 521 are controlled by phase controller 560. The switches of inverter leg 522 are controlled by phase controller 550. Phase controller 550 and phase controller 560 may be provided in a common control unit or may be discrete control units.

A sinusoidal reference signal is provided to input 551. A voltage VB is provided to input 552 which is the voltage between system output 536 and system output 534. Operator 553 determines the difference between the negative of input 551 and input 552 and provides the difference to PI voltage loop 554. The current IB through inductor 535 is provided to input 556. Operator 557 determines the difference between the output of PI voltage loop 554 and input 556 and provides that difference to PI current loop 558. PI current loop 558 outputs a control signal to control the switches of inverter leg 522.

Input 562 receives a voltage VA which is the voltage between system output 532 and system output 534. Operator 563 determines the difference between input 551 and input 562 and outputs the difference to PI voltage loop 564. Operator 567 determines the difference between the output of PI voltage loop 564 and input 566. Input 566 receives the current IA flowing through inductor 531. Operator 567 outputs the difference between PI voltage loop 564 and input 566 to PI current loop 568. PI current loop 568 outputs control signals to control the switches of inverter leg 521.

As further illustrated in FIG. 5, common mode controller 590 is configured to control the switches of inverter leg 523 to output a voltage equal to one half of the voltage of DC bus 510. Common mode controller 590 may utilize the same or similar control techniques as described above in connection with common mode controller 490.

Figure 6:
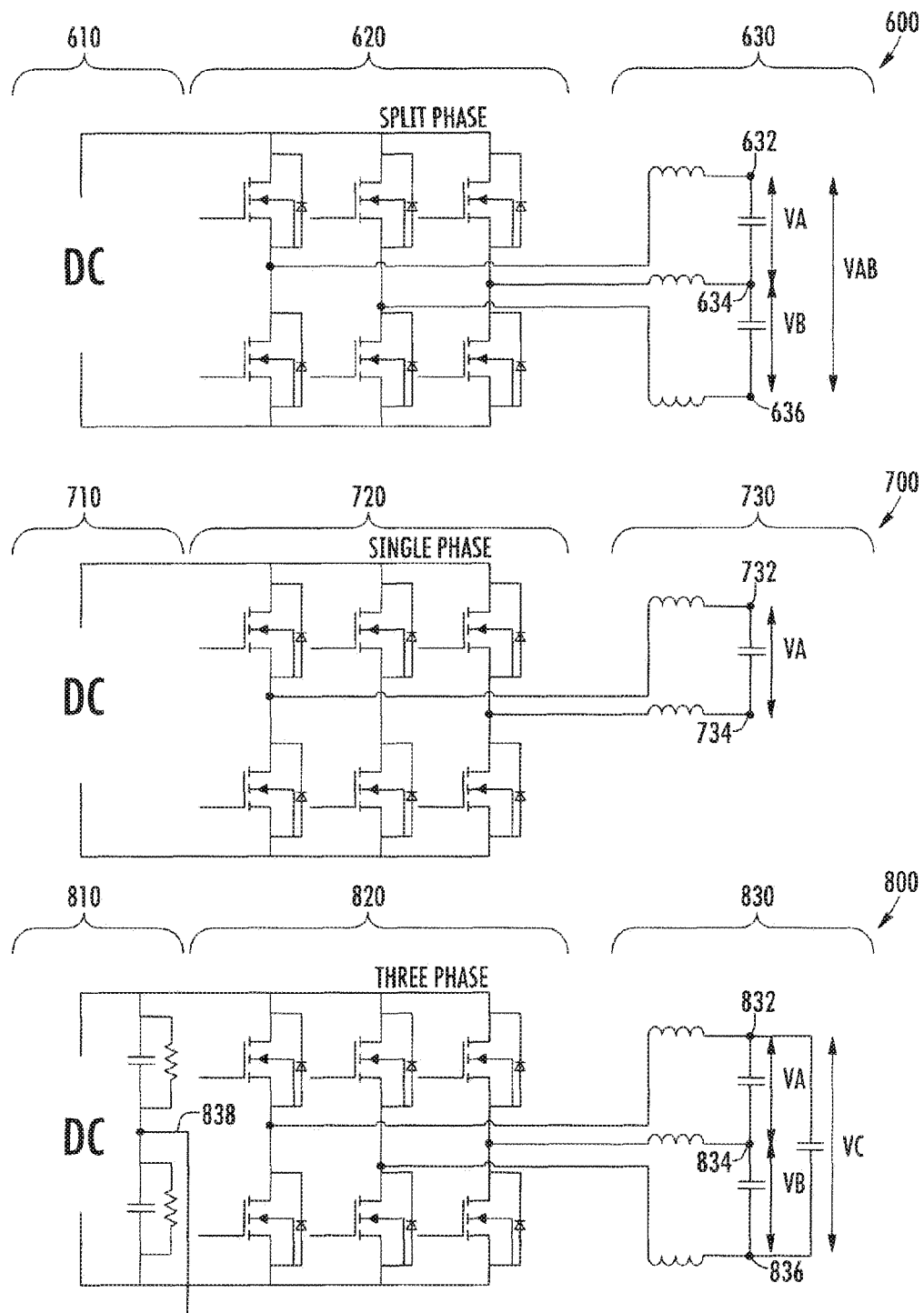
FIG. 6 is a circuit diagram illustrating exemplary output modes of a split phase power conversion system.

With reference to FIG. 6 there are illustrated three operating modes for exemplary split phase power conversion systems such as those disclosed herein. In operating mode 600, the system including DC bus 610, inverter 620 and output 630 is controlled to provide a first 120 volt sinusoidal output VA and a second 120 volt sinusoidal output VB which is 180 degrees out of phase with output VA and a 240 volt output VAB. In operating mode 700, a system including DC bus 710, inverter 720 and output 730 is controlled to provide a single sinusoidal output voltage VA between system outputs 732 and 734. In operating mode 800, a system including DC bus 810, inverter 820 and output 830 is controlled to provide a 208 volt sinusoidal output voltage VA between system outputs 832 and 834, a 208 volt sinusoidal output voltage VB between output nodes 834 and 836, and a 208 volt sinusoidal output voltage VC between output nodes 832 and 836. Output voltages VA, VB and VC are 120 degrees out of phase with respect to one another. A resistor/capacitor bridge 838 across the DC bus 810 is provided in order to provide a neutral line for the three phase system output.

It shall be appreciated that systems such as those described above in connection with FIGS. 1-5 may be configured to provide dedicated operation in accordance with any of operating modes 600, 700 or 800, or may be selectably controllable to provide operation in accordance with two or more of operating modes 600, 700 and 800. It shall be further appreciated that the aforementioned voltages are nominal and may vary depending on the needs of the loads being driven. During operation the nominal voltage provided by an output may increase or decrease such as may occur due to load fluctuation or imbalance. It shall also be appreciated that the aforementioned voltages are exemplary rather than limiting and that systems with different nominal output voltages and phase differences are contemplated in certain embodiments.

It shall be understood that the exemplary embodiments summarized and described in detail above and illustrated in the figures are illustrative and not limiting or restrictive. Only the presently preferred embodiments have been shown and described and all changes and modifications that come within the scope of the invention are to be protected. It shall be appreciated that the embodiments and forms described above may be combined in certain instances and may be exclusive of one another in other instances. Likewise, it shall be appreciated that the embodiments and forms described above may or may not be combined with other aspects and features. It should be understood that various features and aspects of the embodiments described above may not be necessary and embodiments lacking the same are also protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system comprising:
   a generator structured to generate an AC voltage;
   an AC/DC converter coupled to the generator and structured to receive the AC voltage from the generator and covert the AC voltage into a DC input voltage;
   a DC bus coupled to the AC/DC converter, the DC bus including a first DC rail and a second DC rail structured to receive the DC input voltage from the AC/DC converter;
   an inverter coupled to the DC bus and structured to receive the DC input voltage from the DC bus, the inverter including a first leg, a second leg, and a third leg, each of the legs including a first switch and a second switch coupled in series between the first DC rail and the second DC rail and an output node between the first switch and the second switch;
   an output circuit including:
      a first system output node coupled with the output node of the first leg;
      a second system output node coupled with the output node of the second leg; and a third system output node coupled with the output node of the third leg;
a differential mode controller configured to control the first and second switches of the first leg and the second leg using a first voltage between the first system output node and the second system output node and a current difference between a first current at the first system output node and a second current at the second system output node; and
a common mode controller configured to control the first and second switches of the third leg, wherein the common mode controller is configured to provide a 50% duty cycle of the first and second switches of the third leg regardless of load imbalance on the first leg and the second leg, so that an voltage at the output node of the third leg equals one half of a DC input voltage between the first DC rail and the second DC rail.

2. A system of claim 1, wherein the output circuit further including:
a first inductor coupled in series between the output node of the first leg and the first system output node;
a second inductor coupled in series between the output node of the second leg and the second system output node;
a third inductor coupled in series between the output node of the third leg and the third system output node;
a first capacitor coupled in series between the first system output node and the third system output node; and
a second capacitor coupled in series between the second system output node and the third system output node.

3. A system of claim 1, wherein the differential mode controller and the common mode controller are structured to provide a split phase output, the split phase output including:
a first phase output voltage between the first system output node and the third system output node;
a second phase output voltage between the second system output node and the third system output node; and
a combined output voltage between the first system output node and the second system output node.

4. A system of claim 1, wherein the differential mode controller comprises:
a voltage control loop structured to generate a first output using a first difference between reference data and the first voltage; and
a current control loop structured to generate the first control signal using the first output and the current difference.

5. A system of claim 1, wherein the differential mode controller and the common mode controller are structured to provide a three phase output, the three phase output including:
a first phase output voltage between the first system output node and the second system output node;
a second phase output voltage between the second system output node and the third system output node; and
a third phase output voltage between the first system output node and the third system output node.

6. A system of claim 1, wherein the differential mode controller and the common mode controller are structured to selectably provide:
a single phase output voltage between the first system output node and the third system output node, the second system output node and the third system output node, or the first system output node and the second system output node in a first configuration;
a split phase output including a first phase output voltage between the first system output node and the third system output node, a second phase output voltage between the second system output node and the third system output node, and a combined output voltage between the first system output node and the second system output node in a second configuration; or
a three phase output node including a first phase output voltage between the first system output node and the second system output node, a second phase output voltage between the second system output node and the third system output node, and a third phase output voltage between the first system output node and the third system output node in a third configuration.

7. A system comprising:
an inverter including a first leg, a second leg, and a third leg coupled in parallel, each of the legs including a plurality of switching devices;
an output circuit including a first system output node coupled with the first leg, a second system output node coupled with the second leg, and a third system output node coupled with the third leg;
a first controller configured to control the switching devices of the first leg and the second leg using a first voltage between the first system output node and the second system output node and a current difference between a first current at the first system output node and a second current at the second system output node; and
a second controller configured to control the switching devices of the third leg, wherein the second controller is configured to provide a 50% duty cycle of the switching devices of the third leg regardless of load imbalance on the first leg and the second leg, so that an output equals one half of a DC input voltage on the third leg.

8. The system of claim 7, wherein the output circuit further comprises:
a first inductor coupled in series between the first leg and the first system output node;
a second inductor coupled in series between the second leg and the second system output node;
a third inductor coupled in series between the third leg and the third system output node;
a first capacitor coupled in series between the first system output node and the third system output node; and
a second capacitor coupled in series between the second system output node and the third system output node.

9. A system of claim 8, wherein the third inductor has a smaller inductance than the first and second inductors.

10. The system of claim 7, further comprising:
a generator;
an AC/DC converter, wherein the AC/DC converter is coupled to the generator and the DC bus and is structured to receive an AC voltage from the generator, convert the AC voltage into the DC input voltage, and provide the DC input voltage to the DC bus; and
a DC bus, wherein the DC bus receives the DC input voltage and provides the DC input voltage to the inverter.

11. The system of claim 10, wherein the generator, the AC/DC converter, the DC bus, and the inverter are configured as one of a land vehicle auxiliary power system, a stationary standby power system, or a marine vessel power system.

12. The system of claim 10, further comprising a storage battery coupled to the DC bus, wherein in a first selectable mode, the first controller and the second controller are configured to provide an AC voltage waveform output between at least two of the first, second, and third system output nodes based at least in part upon a current from the storage battery.

13. The system of claim 12, wherein in a second selectable mode, the first controller and the second controller are configured to charge the storage battery based at least in part upon a current from at least one of the first, second, and third system output nodes.

14. The system of claim 7, wherein the first controller comprises:
a voltage control loop configured to generate a first output using a first difference between reference data and the first voltage; and
a current control loop configured to generate one or more control signals using the first output and the current difference to control the switching devices of the first leg and the second leg.

15. The system of claim 7, wherein the second controller comprises an open loop controller.

16. A system of claim 7, wherein the inverter is structured to be coupled to a DC bus, and wherein the DC input voltage on the third leg is from the DC bus.

17. A method comprising:
providing a power conversion system comprising an inverter and an output circuit by coupling a first leg of the inverter with a first system output node of the output circuit, a second leg of the inverter with a second system output node of the output circuit, and a third leg of the inverter with a third system output node of the output circuit, wherein the first leg, the second leg, and the third leg are coupled in parallel and each include a plurality of switching devices;
controlling the switching devices of the first leg and the second leg using a first voltage between the first system output node and the second system output node and a current difference between a first current at the first system output node and a second current at the second system output node; and
controlling the switching devices of the third leg to provide an output equal to one half of a DC input voltage on the third leg by providing a 50% duty cycle of the switching devices of the third leg regardless of load imbalance on the first leg and the second leg.

18. The method of claim 17, wherein the switching devices of the first leg and the second leg is controlled by a differential mode controller, and wherein the switching devices of the third leg is controlled by a common mode controller.

19. The method of claim 17, further comprising:
generating an AC voltage using a generator;
converting the AC voltage to the DC input voltage using an AC/DC converter; and
providing the DC input voltage to the inverter using a DC bus.

20. The method of claim 17, wherein the controlling the switching devices of the first leg and the second leg:
generating a first output using a first difference between reference data and the first voltage; and
controlling the switching devices of the first leg and the second leg using the first output and the current difference.

21. The method of claim 17, further comprising providing an AC voltage waveform output between at least two of the first, second, and third system output nodes based at least in part upon a current from a storage battery.

22. The method of claim 17, further comprising charging a storage battery based at least in part upon a current from at least one of the first, second, and third system output nodes.

* * * * *